(12) United States Patent
Yamamoto et al.

(10) Patent No.: US 8,538,991 B2
(45) Date of Patent: Sep. 17, 2013

(54) INFORMATION MANAGING APPARATUS, INFORMATION MANAGING METHOD, AND COMPUTER PRODUCT

(75) Inventors: Kenichi Yamamoto, Yokohama (JP); Hiromi Tanai, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 179 days.

(21) Appl. No.: 11/644,644

(22) Filed: Dec. 22, 2006

(65) Prior Publication Data
US 2008/0059472 A1 Mar. 6, 2008

(30) Foreign Application Priority Data
Aug. 29, 2006 (JP) .................................. 2006-232321

(51) Int. Cl.
*G06F 17/30* (2006.01)

(52) U.S. Cl.
USPC ........................................................ 707/785

(58) Field of Classification Search
USPC ........... 707/9, 10, 201, 203, 999.009, 999.01, 707/999.201, 999.203, 781, 783, 785
See application file for complete search history.

(56) References Cited

U.S. PATENT DOCUMENTS

| 5,870,764 | A  | * | 2/1999  | Lo et al. .......................... 707/203 |
| 6,237,099 | B1 |   | 5/2001  | Kurokawa |
| 6,289,460 | B1 | * | 9/2001  | Hajmiragha ....................... 726/28 |
| 6,327,590 | B1 | * | 12/2001 | Chidlovskii et al. ............ 707/734 |
| 6,681,369 | B2 | * | 1/2004  | Meunier et al. ................. 715/255 |
| 7,085,755 | B2 | * | 8/2006  | Bluhm et al. ...................... 707/3 |
| 7,146,367 | B2 | * | 12/2006 | Shutt ................................. 707/9 |
| 7,277,901 | B2 | * | 10/2007 | Parker et al. .................... 707/203 |
| 7,353,232 | B1 | * | 4/2008  | Kalucha et al. ................. 707/100 |
| 7,716,490 | B2 |   | 5/2010  | Kanai |
| 2001/0027472 | A1 | * | 10/2001 | Guan ............................. 709/203 |
| 2003/0105950 | A1 | * | 6/2003  | Hirano et al. .................. 713/100 |

(Continued)

FOREIGN PATENT DOCUMENTS

| JP | 57-206977 | 12/1982 |
| JP | 62-241061 | 10/1987 |

(Continued)

OTHER PUBLICATIONS

Office Action issued by the Patent Office of Japan for Japanese Application No. 2006-232321, mailed May 17, 2011 (with English language translation).
Office Action issued by the Patent Office of Japan for Japanese Application No. 2011-158421, mailed Oct. 2, 2012 (with English language translation).

(Continued)

*Primary Examiner* — Jorge A Casanova
(74) *Attorney, Agent, or Firm* — Greer, Burns & Crain, Ltd.

(57) ABSTRACT

A method of a computer, the method including the computer authorizing, not only a first user, but also a second user to access data that is created by the first user and is stored in association with a community. Wherein the first user is registered as a member who belongs to a group, wherein a member belonging to the group is authorized to access data that is accessibly stored for the member of the group, and the second user is defined as a superior of the first user in organization information that indicates hierarchical-relation of users and does not belong to the group. The computer rejects access to the data for an additional user, wherein the additional user has been determined not to be within a publication range of the data, even though the user is within a publication range of the community to which the data belongs.

4 Claims, 13 Drawing Sheets

(56) References Cited

U.S. PATENT DOCUMENTS

| | | |
|---|---|---|
| 2004/0006594 A1* | 1/2004 | Boyer et al. ............... 709/204 |
| 2004/0085354 A1* | 5/2004 | Massand ..................... 345/751 |
| 2005/0097441 A1* | 5/2005 | Herbach et al. ............ 715/501.1 |
| 2005/0120199 A1* | 6/2005 | Carter ......................... 713/150 |
| 2005/0273465 A1 | 12/2005 | Kimura |
| 2006/0069676 A1 | 3/2006 | Takatsu et al. |
| 2006/0106811 A1* | 5/2006 | Blumenau et al. .......... 707/10 |
| 2006/0149567 A1* | 7/2006 | Muller et al. ............... 705/1 |
| 2006/0173722 A1 | 8/2006 | Mizutani |
| 2006/0173908 A1* | 8/2006 | Browning et al. .......... 707/104.1 |
| 2006/0184452 A1* | 8/2006 | Barnes et al. ............... 705/50 |
| 2006/0277089 A1* | 12/2006 | Hubbard et al. ............ 705/9 |
| 2007/0136662 A1* | 6/2007 | Khaba ......................... 715/530 |
| 2007/0150299 A1* | 6/2007 | Flory ........................... 705/1 |
| 2007/0162400 A1* | 7/2007 | Brew et al. .................. 705/59 |
| 2007/0260648 A1* | 11/2007 | Friesenhahn et al. ...... 707/203 |
| 2008/0104408 A1* | 5/2008 | Mayer ......................... 713/178 |

FOREIGN PATENT DOCUMENTS

| | | |
|---|---|---|
| JP | 09-218827 | 8/1997 |
| JP | 10-143414 | 5/1998 |
| JP | 2003-141381 | 5/2003 |
| JP | 2005-284436 | 10/2005 |
| JP | 2005-346543 | 12/2005 |
| JP | 2006-099601 | 4/2006 |
| JP | 2006-209736 | 8/2006 |
| JP | 2006-323535 | 11/2006 |

OTHER PUBLICATIONS

Office Action issued by the Patent Office of Japan for Japanese Application No. 2006-232321, mailed Jan. 29, 2013 (with English language translation).

Interrogation issued by the Patent Office of Japan for Japanese Application No. 2006-232321, mailed Jul. 31, 2012 (with English language translation).

* cited by examiner

FIG.2

ACCOUNT INFORMATION

| USER ID | PASSWORD |
|---------|----------|
| A | oooo |
| B | oooo |
| C | oooo |
| D | oooo |
| E | oooo |
| F | oooo |
| G | oooo |
| H | oooo |
| ⋮ | ⋮ |

FIG.3

HIERARCHICAL-RELATION INFORMATION

| SUPERIOR ID | SUBORDINATE ID |
|-------------|----------------|
| G | A |
| G | B |
| G | C |
| H | D |
| H | E |
| H | F |
| I | G |
| I | H |
| ⋮ | ⋮ |

ARTICLE-MANAGEMENT INFORMATION

| ARTICLE-IDENTIFICATION INFORMATION | ARTICLE CREATOR ID | PUBLICATION RANGE | CONTENT OF ARTICLE |
|---|---|---|---|
| C1 | A | B | ARTICLE INFORMATION CORRESPONDING TO ARTICLE-IDENTIFICATION INFORMATION C1 |
| C2 | C | CD | ARTICLE INFORMATION CORRESPONDING TO ARTICLE-IDENTIFICATION INFORMATION C2 |
| ⋮ | ⋮ | ⋮ | ⋮ |

FIG. 6

STORAGE-LOCATION MANAGEMENT INFORMATION

| STORAGE-LOCATION-IDENTIFICATION INFORMATION | ADMINISTRATOR ID | LOCATION PUBLICATION RANGE | ARTICLE-IDENTIFICATION INFORMATION |
|---|---|---|---|
| P1 | H | CDEH | C2 |
| | | | C4 |
| | | | ⋮ |
| P2 | C | AED | C5 |
| | | | C8 |
| | | | ⋮ |
| ⋮ | ⋮ | ⋮ | ⋮ |

INFORMATION MANAGING APPARATUS, INFORMATION MANAGING METHOD, AND COMPUTER PRODUCT

BACKGROUND OF THE INVENTION

1. Field of the Invention

The present invention generally relates to a technology for managing information on an article shared among users on a network.

2. Description of the Related Art

In recent years, network environments have been placed in companies, so that individual members of a company can exchange opinions with one another via the network. For example, a company member (hereinafter, "member") creates an article (e.g., an article about messages related to company activities, topical news, technical topics, or topics of conversation among friends) using a blog or the like, and makes information on the created article public to the other members. The publication range of the article created by the member depends on situations. Namely, the publication range often spreads over entire members or is limited only to colleagues of the member. The member who created the article sets the publication range of the article in view of the content of the article, the company regulations, and the like.

By doing so, only the limited members have access to the article, leakage of personal information on the member is prevented, and leakage of secret information associated with the article to a malicious third party is prevented.

A personal-connection information search system (hereinafter, "search system") is disclosed in, for example, Japanese Patent Application Laid-Open No. 2003-141381. According to the Japanese Patent Application Laid-Open No. 2003-141381, information on personal connections of a plurality of users and information on the respective users are registered in a database in advance. If the search system receives search-target information from a terminal of one of the users, then the search system refers to the information registered in the database and outputs personal-connection information corresponding to the received search-target information to the users concerned. It is thereby possible to mediate between the personal connections among the respective users.

The conventional technique as disclosed in the Japanese Patent Application Laid-Open No. 2003-141381 has, however, the following disadvantages. If the article created by a certain member is to be censored according to the company regulations or the like, the censorship range of the article based on the company regulations does not always coincide with the publication range of the article set by the member who created the article. Furthermore, it is difficult to appropriately set the censorship range. Therefore, if the censorship range is erroneously set, problems such as invasion of privacy and leakage of secret information occur.

SUMMARY OF THE INVENTION

It is an object of the present invention to at least partially solve the problems in the conventional technology.

A computer-readable recording medium according to one aspect of the present invention stores therein a computer program for managing information an article shared among a plurality of users on a network. The computer program causes a computer to execute storing hierarchical-relation information indicating information on a user having a hierarchical relation and article information created by a user in an associated manner; and determining, when an access request to the article information is received, whether to authorize a terminal of a source of the access request to access the article information, based on the hierarchical-relation information.

An apparatus according to another aspect of the present invention is for managing information an article shared among a plurality of users on a network. The apparatus includes a storing unit that stores hierarchical-relation information indicating information on a user having a hierarchical relation and article information created by a user in an associated manner; and a determining unit that determines, when an access request to the article information is received, whether to authorize a terminal of a source of the access request to access the article information, based on the hierarchical-relation information.

A method according to still another aspect of the present invention is for managing information an article shared among a plurality of users on a network. The method includes storing hierarchical-relation information indicating information on a user having a hierarchical relation and article information created by a user in an associated manner; and determining, when an access request to the article information is received, whether to authorize a terminal of a source of the access request to access the article information, based on the hierarchical-relation information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a table for explaining an example of a data structure of account information;

FIG. 3 is a table for explaining an example of a data structure of hierarchical-relation information;

FIG. 6 is a table for explaining an example of a data structure of storage-location-management information;

DETAILED DESCRIPTION OF THE PREFERRED EMBODIMENTS

Exemplary embodiments of the present invention will be explained in detail below with reference to the accompanying drawings.

The outline and features of the information managing apparatus according to an embodiment of the present invention will first be explained. The information managing apparatus records therein information on users who have the hierarchical relation (e.g., the superior-and-subordinate relation in a company) (hereinafter, "hierarchical-relation information"). If receiving an access request to information on an article (hereinafter, "article information") created by a user (hereinafter, "article creator"), the information managing apparatus determines whether to authorize a terminal (hereinafter, "client") of a user who transmits the access request (hereinafter, "access requester") based on information on the access requester and the hierarchical-relation information. Specifically, if the access requestor is the superior of the article creator, the information managing apparatus authorizes the client of the access requester to access the article information.

Furthermore, the information managing apparatus records therein article information created by a plurality of the users ("article creators") in a community managed by one of the users (hereinafter, "community administrator or administrator") (or a location which is sponsored or managed by someone and to which articles according to a specific theme or policy are gathered). If receiving an access request to access the article information belonging to the community, the information managing apparatus determines whether to authorize the client of an access requester to access the article information belonging to the community based on information on the access requestor and the hierarchical-relation information. Specifically, if the access requester is the superior of the community administrator, the information managing authorizes the access requester to access the article information belonging to the community.

In this manner, the information managing apparatus according to the embodiment controls access to the article information based on the hierarchical-relation information. It is, therefore, advantageously possible to censor the article created by the users while setting an appropriate censorship range of the article information. Moreover, the superior responsible for supervising the article creator, i.e., his/her subordinate censors the article information created by the subordinate. It is, therefore, advantageously possible to solve the problems such as the invasion of privacy of the article creator and the leakage of secret information related to the article information.

Figure 1:
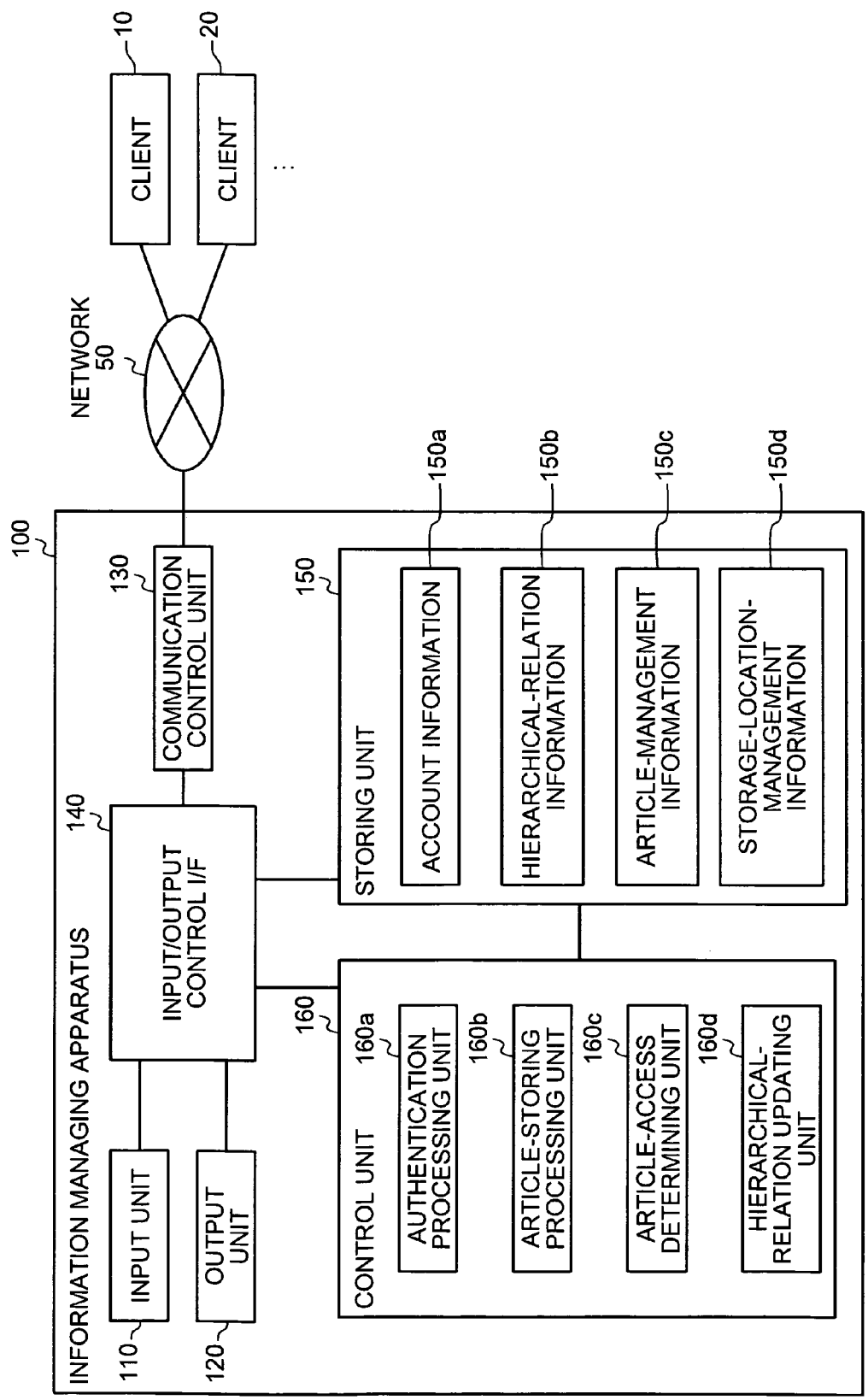
FIG. 1 is a functional block diagram of an information managing apparatus according to an embodiment of the present invention.

FIG. 1 is a block diagram of an information managing apparatus 100 according to the present embodiment of the present invention. As shown in FIG. 1, the information managing apparatus 100 is connected to clients 10 and 20 via a network 50. The information managing apparatus 100 includes an input unit 110, an output unit 120, a communication control unit 130, an input/output control interface (I/F) 140, a storing unit 150, and a control unit 160. Although the clients 10 and 20 are shown for the convenience of explanation, the information managing apparatus 100 can be connected to not only the clients 10 and 20 but also the other clients and can hold data communication with each of the clients.

The input unit 110 is input means from which various pieces of information are input to the information managing apparatus 100. The input unit 110 is configured to include, for example, a keyboard, a mouse, a microphone, and a medium reader that reads data from a recording medium (e.g., a flexible disk (FD), a CD-ROM, a DVD disk, a magneto-optical disk or an IC card). A combination of a monitor included in the output unit 120 and the mouse included in the input unit 110 functions as a pointing device.

The output unit 120 is output means from which various pieces of information are output, and is configured to include, for example, the monitor (which can be a display or a touch panel) and a loudspeaker. The communication control unit 130 is means for mainly controlling a communication between the information managing apparatus 100 and each of the clients 10 and 20. The input/output control I/F 140 is means for controlling the input unit 110, the output unit 120, the communication control unit 130, the storing unit 150, and the control unit 160 to input/output data.

The storing unit 150 is means for storing data and programs necessary for various processings performed by the control unit 160. Specifically, the storing unit 150 includes, particularly as units of close relevance to the present embodiment, account information 150a, hierarchical-relation information 150b, article-management information 150c, and storage-location management information 150d.

The account information 150a is data for managing the account of each user. FIG. 2 is a table for explaining an example of the data structure of the account information. As shown in FIG. 2, the account information includes user identification (ID) for identifying each user and a password corresponding to the user ID.

Figures 4, 5:
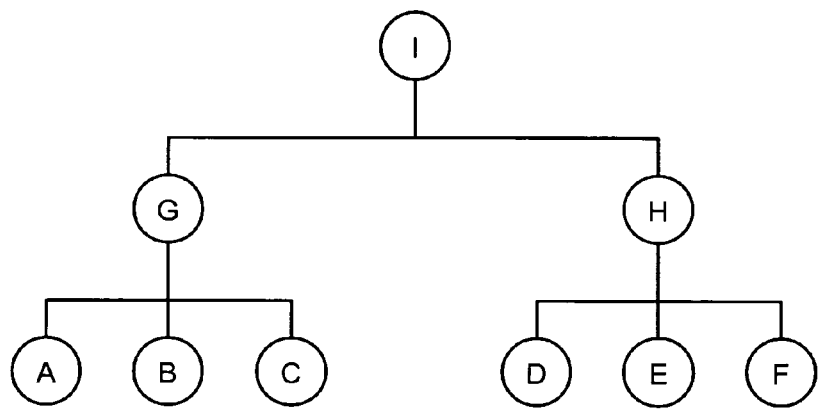
FIG. 4 is a tree diagram of the hierarchical-relation information shown in FIG. 3.
FIG. 5 is a table for explaining an example of a data structure of article-management information.

The hierarchical-relation information 150b is recorded data of information on users who have the superior-subordinate relation in a company. FIG. 3 is a table for explaining an example of the data structure of the hierarchical-relation information. FIG. 4 is a tree diagram of the hierarchical-relation information shown in FIG. 3. As shown in FIGS. 3 and 4, subordinates of a user identified by a user ID "E" (hereinafter, user "E"; the same shall apply hereafter) are users "A to D". Subordinates of a user "J" are users "F to I". Subordinates of a user "K" are users "E and J".

The article-management information 150c is recorded data of the correspondence among the article information, information on the article creator of the article information, and information on the publication range of the article information. FIG. 5 is a table for explaining an example of the data structure of the article-management information. As shown in FIG. 5, the article-management information includes article-identification information on each piece of article information, the user ID of the article creator who creates the article information, the publication range of the article information, the content of the article information, and a keyword flag. The article-identification information is used for identifying each piece of article information. The user ID is used for identifying the article creator. The keyword flag indicates whether a keyword is present in the article information.

As shown in FIG. 5, article information identified by article-identification information "C1" (hereinafter, article information "C1"; the same shall apply hereafter) is created by the user "A". A user accessible to the article information "C1" is the user "B". Furthermore, article information "C2" is created by the user "C", and users accessible to the article information "C2" are users "C and D".

The storage-location management information 150d is recorded data of information on a community to which the article information belongs and information on the administrator of the community. FIG. 6 is a table for explaining an example of the data structure of the storage-location management information. As shown in FIG. 6, the storage-location management information includes storage-location identification information, an administrator ID, a location publication range, and the article-identification information. The storage-location identification information is information for identifying each community, and the administrator ID is information for identifying the administrator of the community. Furthermore, the location publication range indicates the publication range of the community, and the article-identification information is information for identifying the article information belonging to the community.

As shown in FIG. 6, the community identified by the storage-location identification information "P1" (hereinafter, community "P1"; the same shall apply hereafter) is managed by the user identified by the administrator ID "H" (hereinafter, administrator "H"; the same shall apply hereafter). The location publication range of the community "P1" is "C, D, E, and H". The article information belonging to the community "P1" is article information "C2", "C4" and the like. Furthermore, the community "P2" is managed by the administrator "C". The location publication range of the community "P2" is "A, E, and D". The article information belonging to the community "P2" is article information "C5", "C8" and the like. It is assumed herein that the article information that is not included in the article-identification information in the storage-location management information does not belong to any specific communities.

The control unit 160 includes an internal memory that stores therein programs and control data for specifying various processing procedures. The control unit 160 is control means for performing processings according to the respective programs or data. As shown in FIG. 1, the control unit 160 includes, particularly as units of close relevance to the embodiment, an authentication processing unit 160a, an article-information-storing processing unit 160b, an article-access determining unit 160c, and a hierarchical-relation updating unit 160d.

The authentication processing unit 160a is a processing unit that determines whether to authorize the client 10 (for the sake of convenience) to log in to the information managing apparatus 100 when the information managing apparatus 100 receives a login request from the client 10. Specifically, when the information managing apparatus 100 receives the login request, the authentication processing unit 160a compares the user ID and the password output from the client 10 with the account information. Namely, the authentication processing unit 160a determines whether the user of the client 10 indicated by the user ID and the password is eligible to log into the information managing apparatus 100. If determining that the user of the client 10 indicated by the user ID and the password is eligible, the authentication processing unit 160a authorizes the client 10 to log in to the information managing apparatus 100.

The article-information-storing processing unit 160b is a processing unit that acquires various information on the article information output from the client 10 authorized to log in to the information managing apparatus 100. The article-information-storing processing unit 160b records the acquired article information as the article-management information 150c.

Specifically, the article-information-storing processing unit 160b acquires the article information, the user ID of the article creator, and the publication range of the article information from the client 10. Furthermore, the article-information-storing processing unit 160b associates the acquired article information, user ID of the article creator, and publication range of the article information, and records them as the article-management information 150c. Moreover, if the article information acquired from the client 10 belongs to a specific community, the article-information-storing processing unit 160b records the correspondence between the (specific) community (storage-location identification information) and the article-identification information as the storage-location management information 150d.

The article-access determining unit 160c is a processing unit that determines whether to authorize the client of the access requester who transmits an access request based on the hierarchical-relation information. Specifically, when the information managing apparatus 100 receives the access request to access the article information from the client 10 of the access requester, i.e., the client 10 authorized to log in, the article-access determining unit 160c determines whether to authorize the client 10 to access the article information. Processings performed by the article-access determining unit 160c for the determination will be explained specifically. The processings include a processing performed for a determination whether to authorize the client 10 of the access requester to access the article information that does not belong to a specific community, and a processing for a determination whether to authorize the client 10 of the access requester to access the article information that belongs to a specific community.

The processing performed when the article-access determining unit 160c determines whether to authorize the client 10 of the access requester to access the article information that does not belong to a specific community will first be explained. When the information managing apparatus 100 receives the access request to access the article information (hereinafter "access-target article information"), the article-access determining unit 160c acquires the user ID of the access requester. Furthermore, the article-access determining unit 160c compares the acquired user ID, the hierarchical-relation information, and the article-management information with one another. Namely, the article-access determining unit 160c determines whether the access requester is the superior of the article creator who created the access-target article information. If the access requester is the superior of the article creator, the article-access determining unit 160c authorizes the client 10 of the access requester to access the access-target article information.

If the access requestor is not the superior of the article creator, the article-access determining unit 160c determines whether the user ID of the access requester is within the publication range of the access-target article information. If the user ID of the access requestor is within the publication range of the access-target article information, the article-access determining unit 160c authorizes the client 10 of the access requester to access the access-target article information.

If the user ID of the access requester is not within the publication range of the access-target article information, the article-access determining unit 160c does not authorize the client 10 of the access requester to access the access-target article information. If the article-access determining unit 160c does not authorize the client 10 of the access requester to access the access-target article information, the access-target article information is not displayed on the client 10 of the access requester.

The processing performed when the article-access determining unit 160c determines whether to access the client 10 of the access requester to access the article information that belongs to a specific community will next be explained. When the information managing apparatus 100 receives the access request to access the access-target article information, the article-access determining unit 160c acquires the user ID of the access requester. Furthermore, the article-access determining unit 160c compares the acquired user ID, the hierarchical-relation information, the article-management information, and the storage-location management information with one another. Namely, the article-access determining unit 160c determines whether the access requestor is the superior of the administrator of the community to which the access-target article information belongs.

If the access requester is the superior of the administrator of the community, the article-access determining unit 160c authorizes the client 10 of the access requester to access the access-target article information. In addition, the article-access determining unit 160c authorizes the client 10 of the access requester to access the other article information belonging to the community. If the access requester is not the superior of the administrator of the community, the article-access determining unit 160c determines whether the user ID of the access requester is within the location publication range.

If the user ID of the access requester is not within the location publication range, the article-access determining unit 160c does not authorize the client 10 of the access requester to access the access-target article information. If the user ID of the access requester is within the location publication range, the article-access determining unit 160c subsequently performs the same processing as "the processing performed when the article-access determining unit 160c determines whether to authorize the client 10 of the access requester to access the article information that does not belong to a specific community".

The hierarchical-relation updating unit 160d is a processing unit that updates the hierarchical-relation information based on new hierarchical-relation information if the information managing apparatus 100 receives the new hierarchical-relation information from the client 10 authorized to log in or from the input unit 110.

Figure 7:
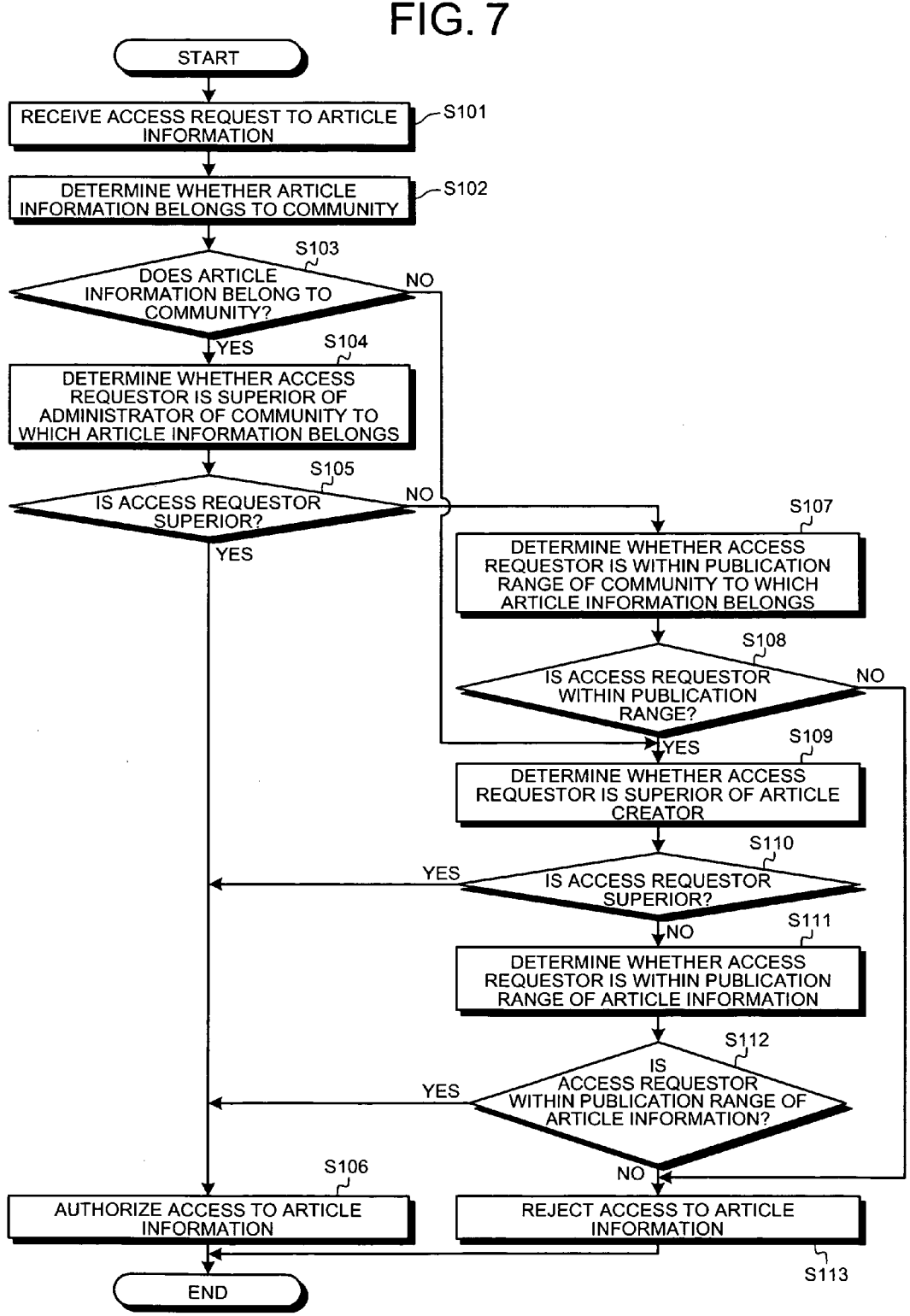
FIG. 7 is a flowchart of a determination processing.

Processing procedures performed by the article-access determining unit 160c will be explained with reference to the flowchart of FIG. 7. The article-access determining unit 160c receives an access request to access the access-target article information from the access requester (step S101). The article-access determining unit 160c determines whether the access-target article information belongs to a specific community (step S102). If the access-target article information does not belong to a specific community (No at step S103), the article-access determining unit 160c goes to step S109.

If the access-target article information belongs to a specific community (Yes at step S103), the article-access determining unit 160c determines whether the access requester is the superior of the administrator of the community to which the access-target article information belongs (step S104). If the access requester is the superior of the administrator of the community (Yes at step S105), the article-access determining unit 160c authorizes the client 10 of the access requester to access the access-target article information (step S106).

If the access requester is not the superior of the administrator of the community (No at step S105), the article-access determining unit 160c determines whether the user ID of the access requester is within the location publication range of the community to which the access-target article information belongs (step S107). If the user ID of the access requester is not within the location publication range (No at step S108), the article-access determining unit 160c goes to step S113.

If the user ID of the access requester is within the location publication range of the community to which the access-target article information belongs (Yes at step S108), the article-access determining unit 160c determines whether the access requestor is the superior of the article creator who created the access-target article information (step S109). If the access requester is the superior of the article creator (Yes at step S110), the article-access determining unit 160c goes to step S106.

If the access requester is not the superior of the article creator (No at step S110), the article-access determining unit 160c determines whether the user ID of the access requester is within the publication range of the access-target article information (step S111). If the user ID of the access requester is within the publication range of the access-target article information (Yes at step S112), the article-access determining unit 160c rejects access of the client 10 of the access requester to access the access-target article information (step S113).

In this manner, the article-access determining unit 160c determines whether the access requester is the superior of the article creator who created the access-target article information. If the access requester is the superior (responsible for supervising his/her subordinate), the article-access determining unit 160c authorizes the client 10 of the access requester to access to the access-target article information. It is, therefore, possible to appropriately censor the article information.

Figure 8:
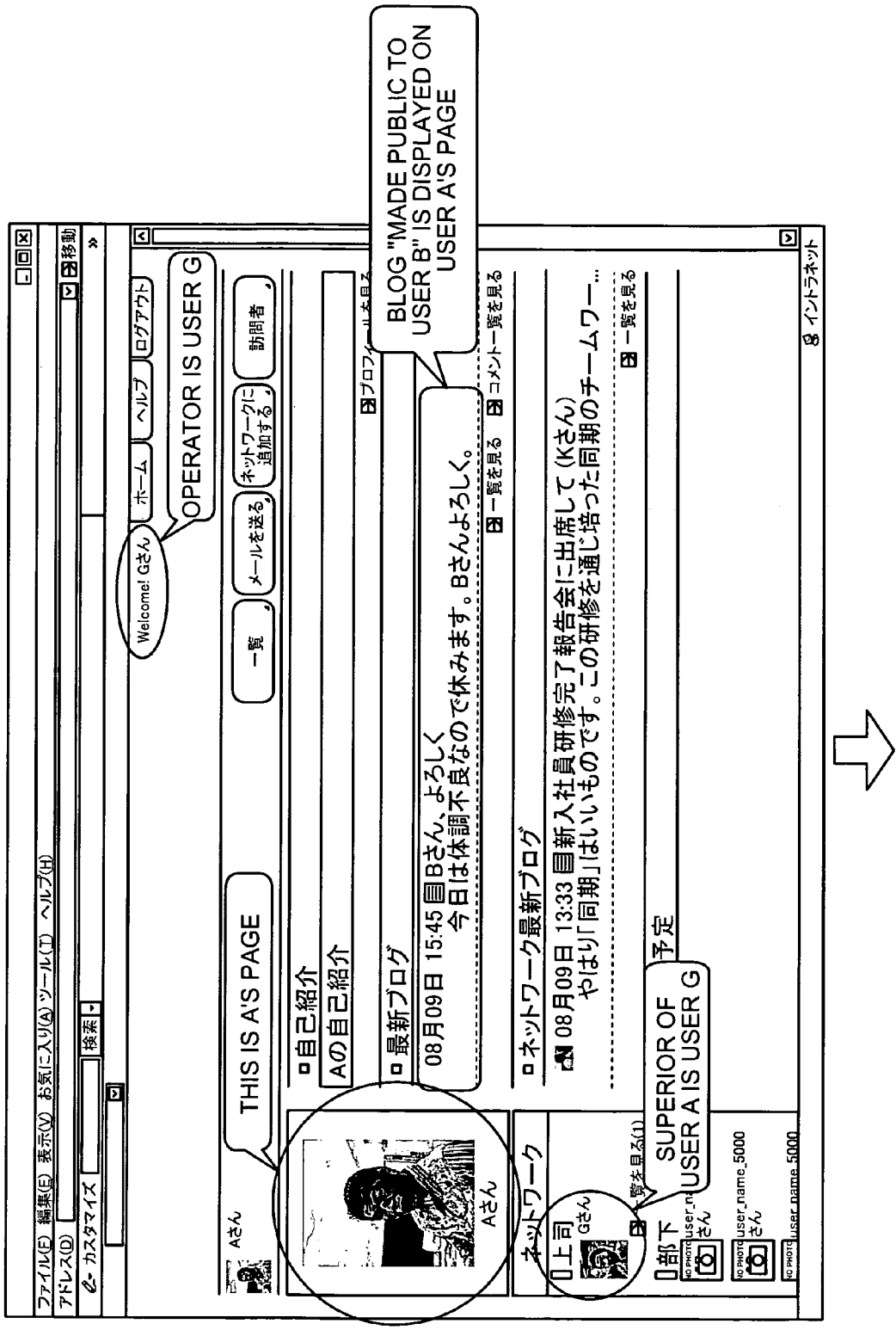
FIGS. 8 to 14 are schematics of examples of a screen displayed on a client.
Figure 9:
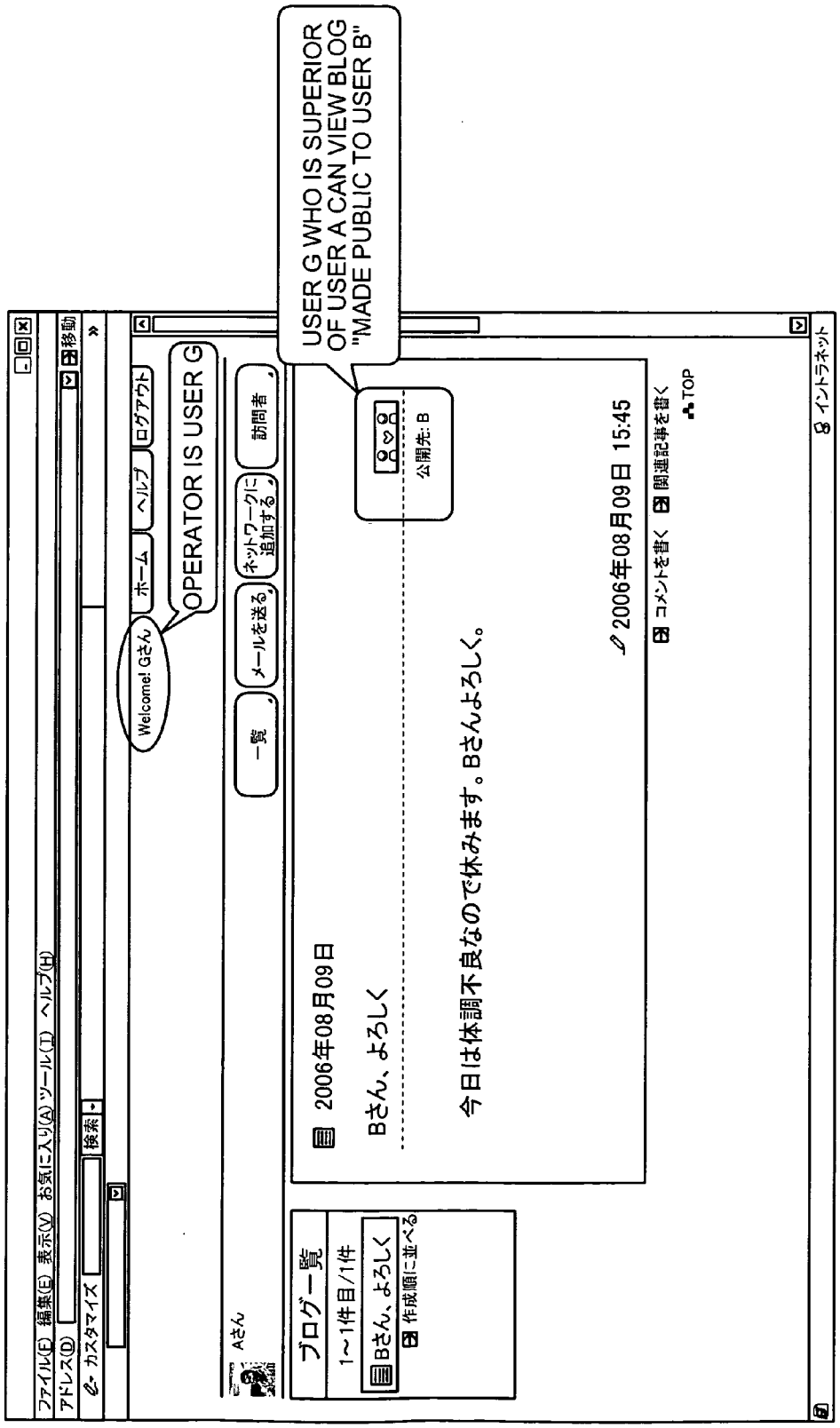

Examples of the screen of the client if the user accesses the information managing apparatus 100 using the user's client will be explained with reference to FIGS. 8 to 14. FIGS. 8 to 14 are first to seventh examples of the screen of the client, respectively. Referring to FIGS. 8 and 9, the client 10 of the user "G" accesses the article information created by the user "A". According to the hierarchical-relation information shown in FIG. 3 or 4, the user "G" is the superior of the user "A". Therefore, the article information created by the user "A" (i.e., information on a blog created by the user "A" and made public to the user "B" in the first and second examples shown in FIGS. 8 and 9) is displayed on the screen of the client 10 operated by the user "G".

Figure 10:
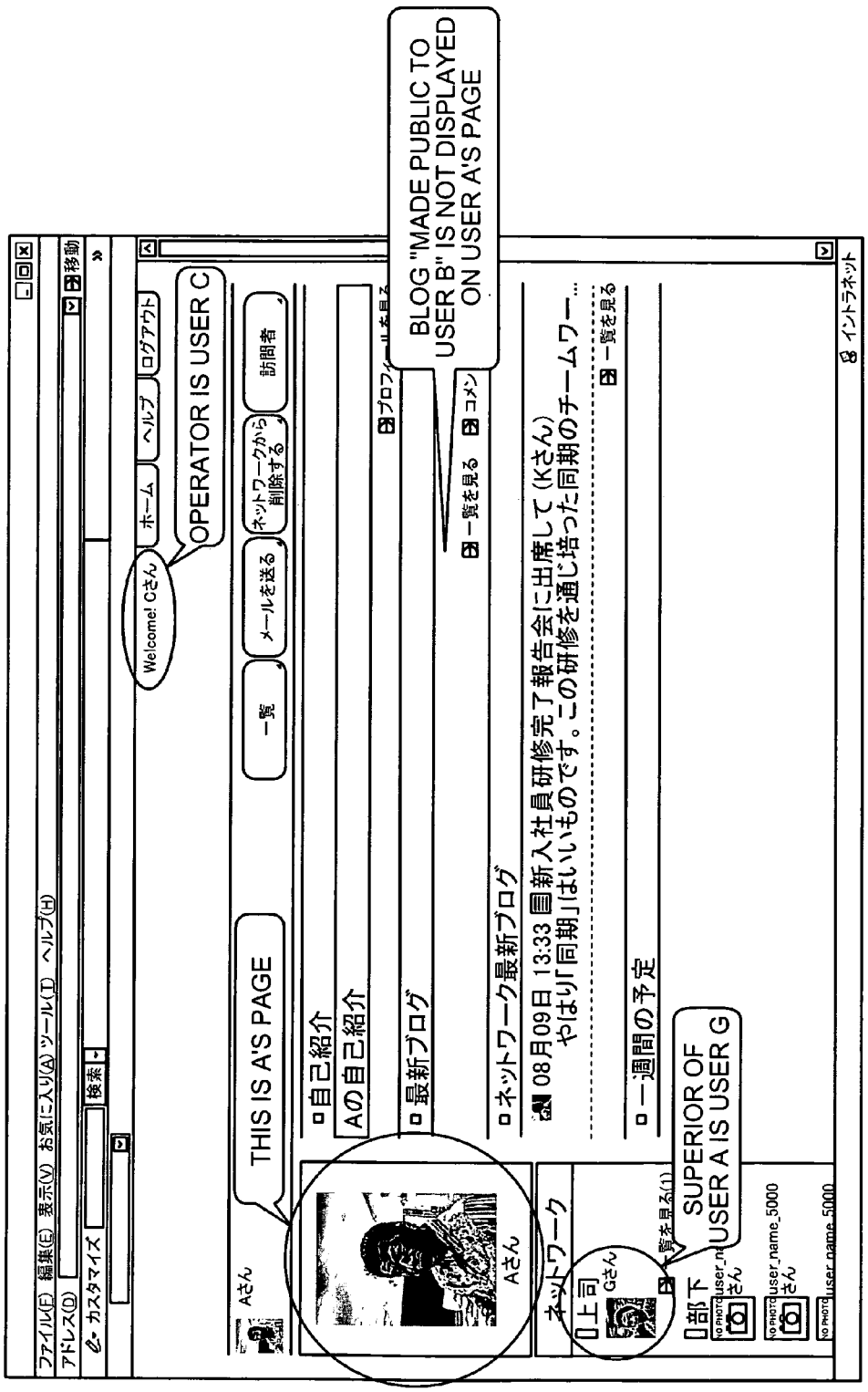

Referring to FIG. 10, the user "C" is not the superior of the user "A" according to the hierarchical-relation information shown in FIG. 3 or 4. Furthermore, the user ID of the user "C" is not within the publication range of the article information created by the user "A" according to the article-management information shown in FIG. 5. Therefore, the article information created by the user "A" is not displayed on the screen of the client 10 operated by the user "C".

Figure 11:
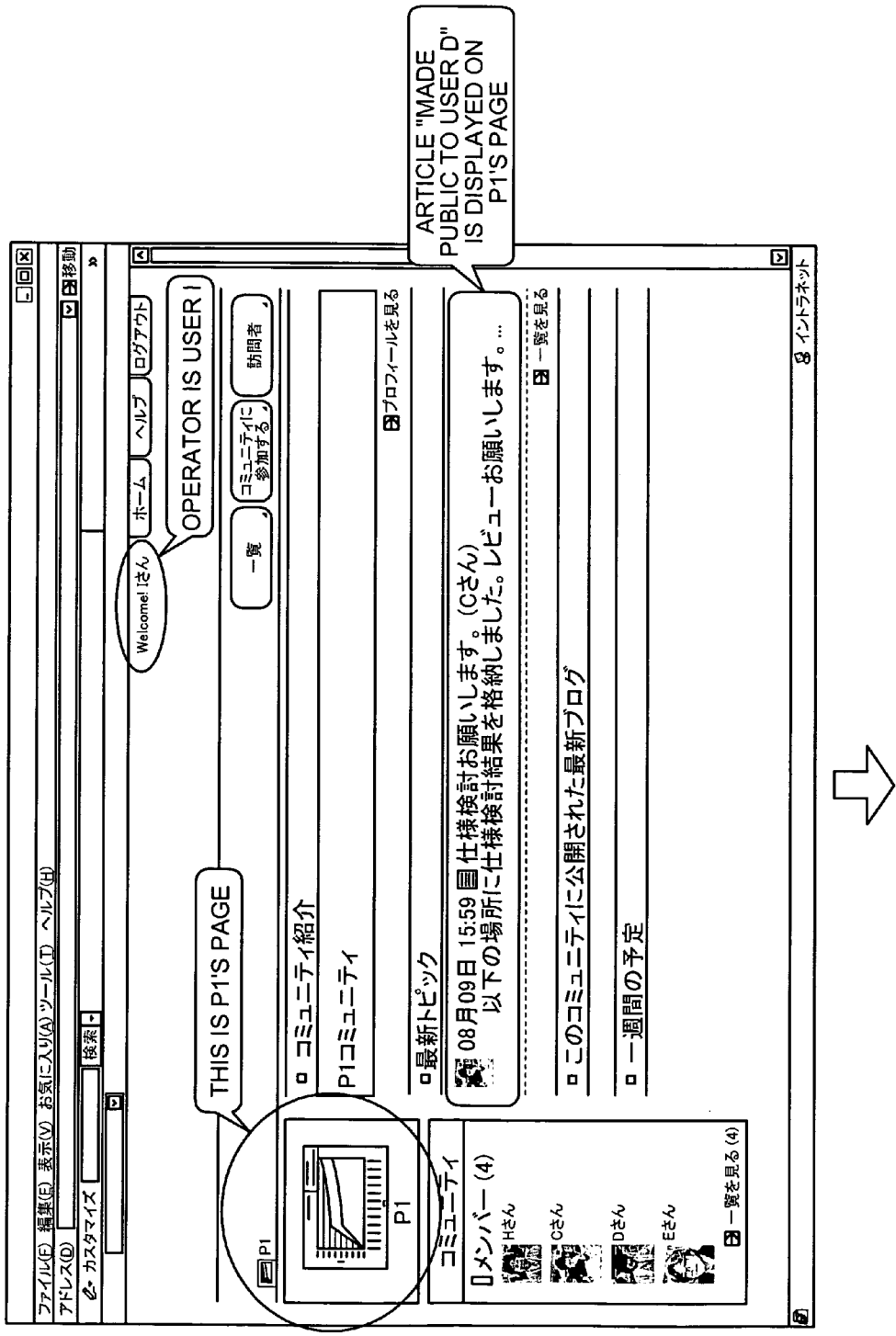
Figure 12:
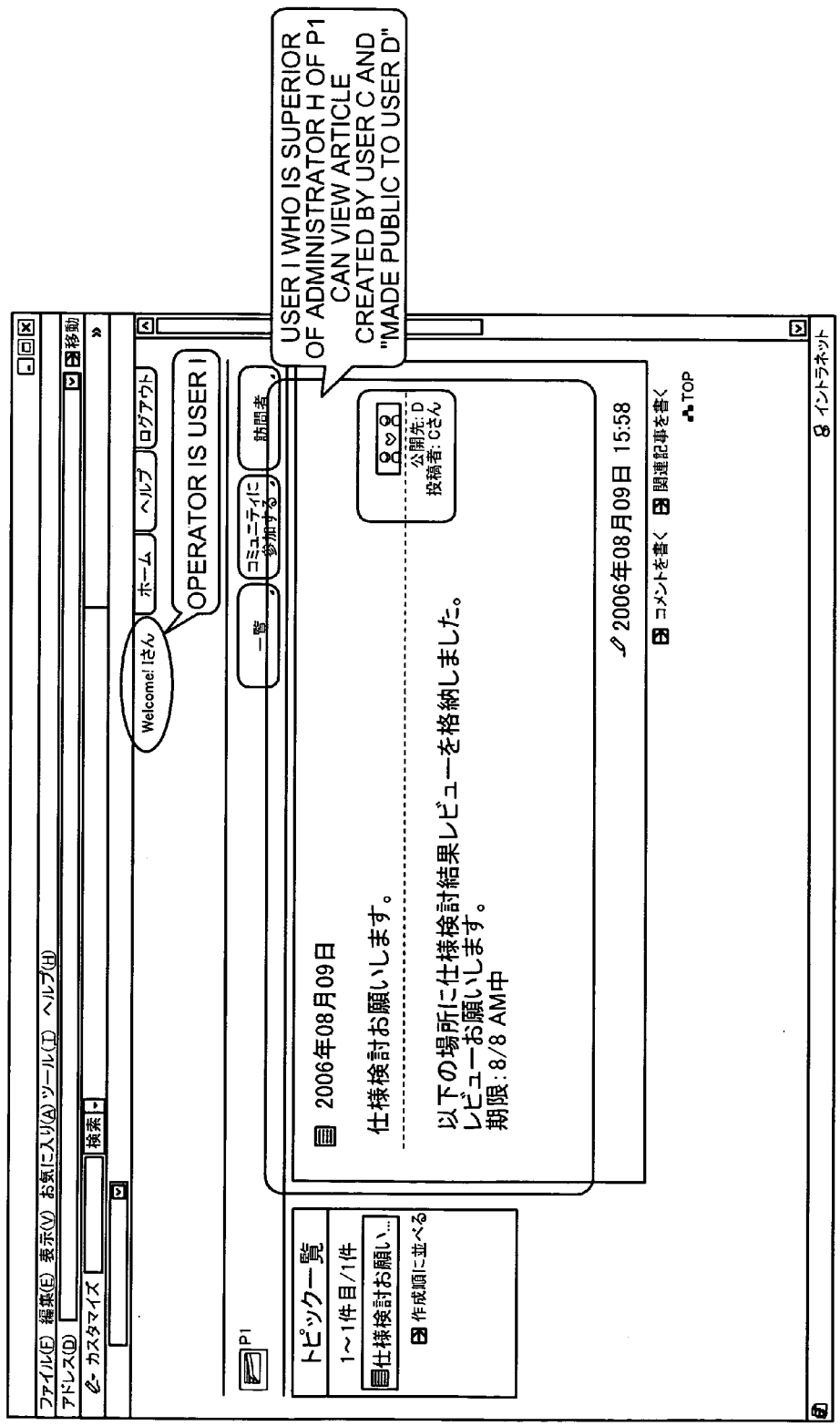
Figure 13:
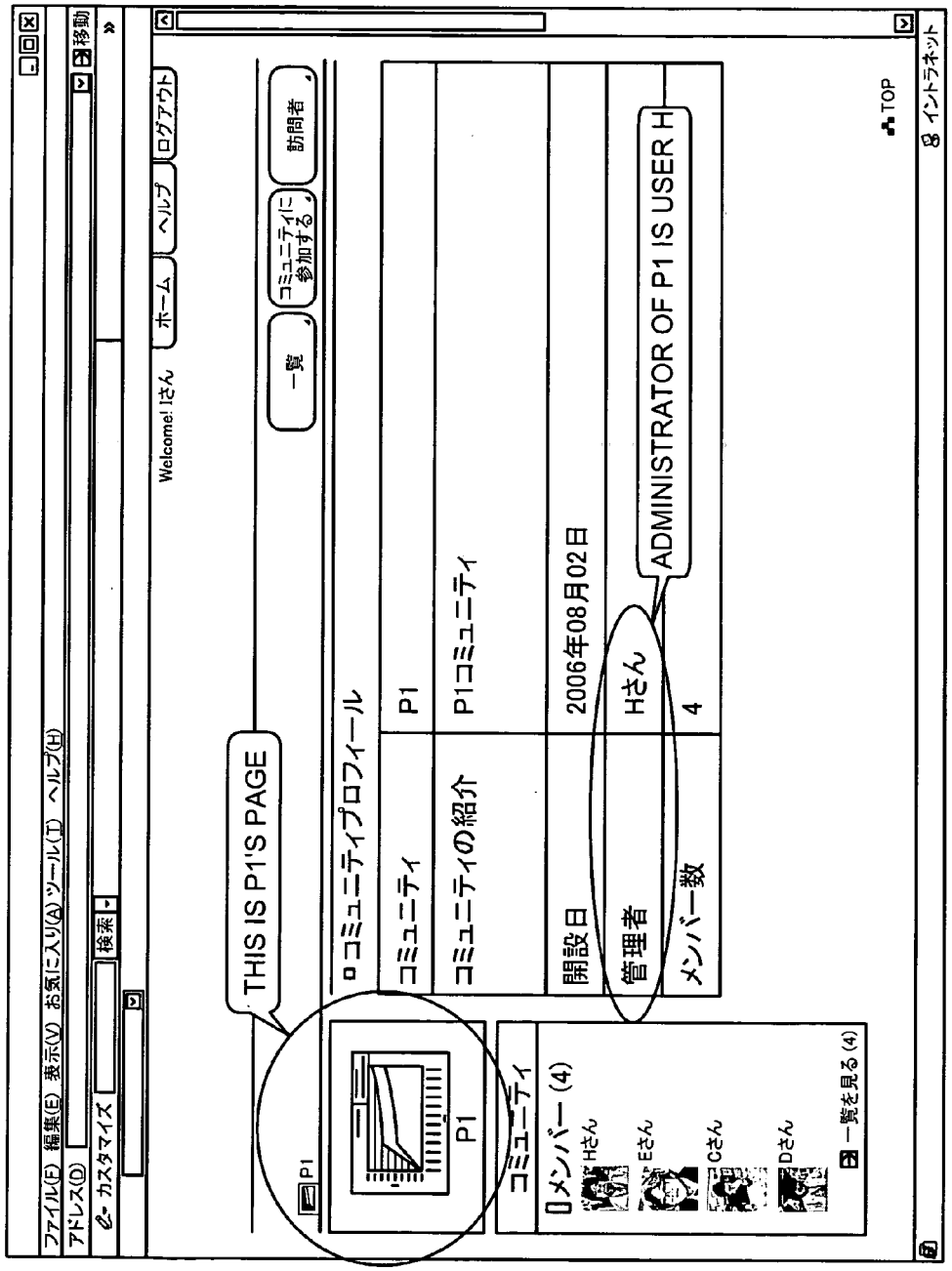

Referring to FIGS. 11 to 13, the user "I" accesses the community "P1" managed by the user "H". According to the hierarchical-relation information shown in FIG. 3 or 4, the user "I" is the superior of the user "H". Therefore, the article information belonging to the community managed by the user "H" (i.e., the article created by the user "C" and made public to the user "D" in the fourth to sixth examples shown in FIGS. 11 to 13) is displayed on the screen of the client 10 operated by the user "I".

Figure 14:
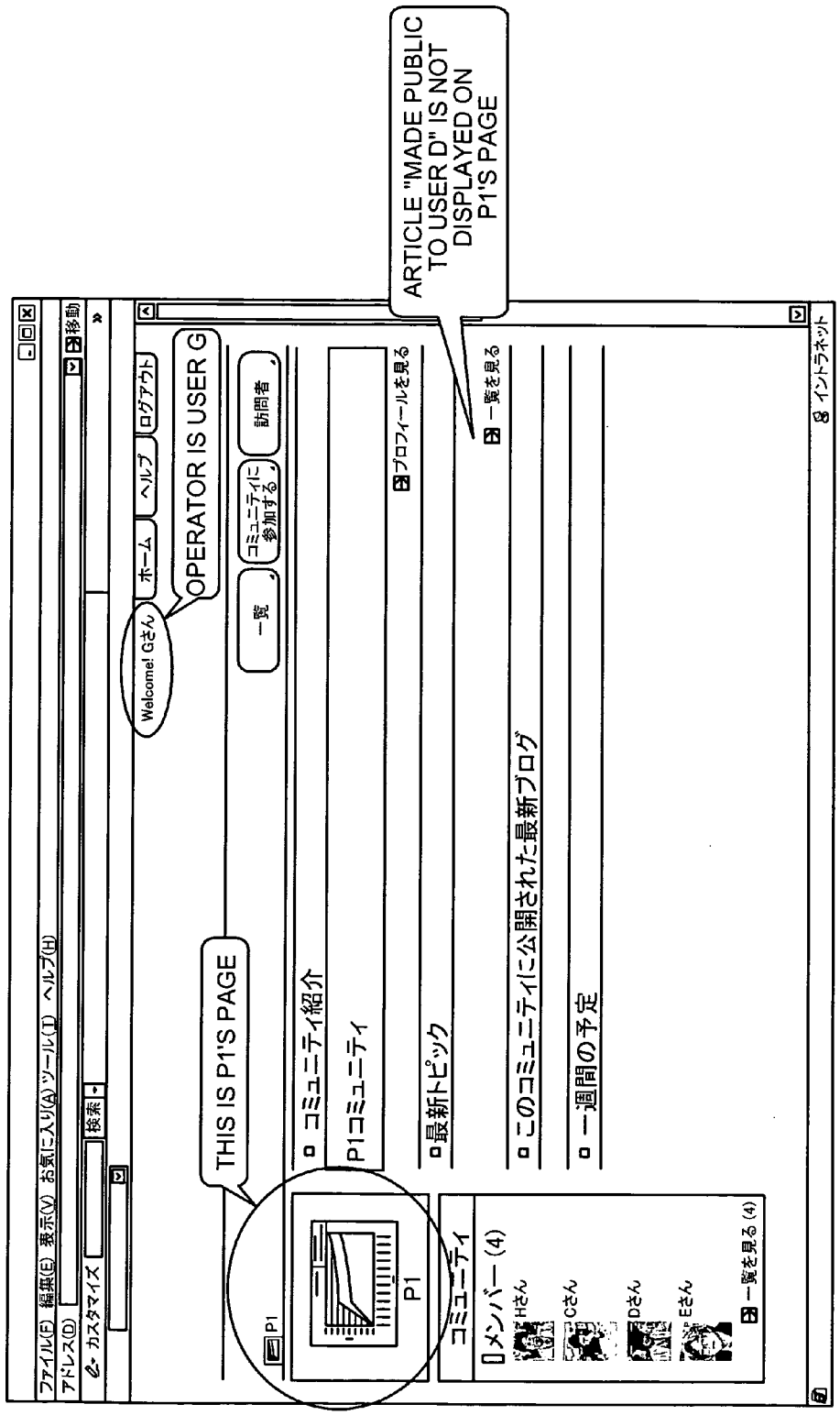

Referring to FIG. 14, the user "G" is not the superior of the user "H" according to the hierarchical-relation information shown in FIG. 3 or 4. Therefore, no article information belonging to the community managed by the user "H" is displayed on the screen of the client 10 operated by the user "G".

As explained so far, the information managing apparatus 100 records the hierarchical-relation information 150b included in the storing unit 150. If receiving the access request to the article information from the client 10 of the access requester, the information managing apparatus 100 determines whether to authorize the client 10 to access the article information based on the information on the access requester, the information on the article creator, and the hierarchical-relation information. Furthermore, article information created by a plurality of users is recorded for every community. If receiving an access request to access one of the article information belonging to a specific community from the client 10 of the access requester, the information managing apparatus 100 determines whether to authorize the client 10 to access the article information belonging to the specific community based on the information on the access requester, the information on the administrator of the community, and the hierarchical-relation information. It is, therefore, possible to censor the article information created by the user while appropriately setting the censorship range of the article information. Moreover, the superior responsible for supervising the user who created the article ("article creator") censors the article information created by his/her subordinate or the superior responsible for supervising activities of his/her subordinate views the article information created under activities of the subordinate. It is, therefore, possible to solve the problems such as the invasion of privacy of the user who created the article information and the leakage of secret information related to the article information.

In the embodiment, the superior-subordinate relation information in the company has been explained as an example of the hierarchical-relation information 150b on the users having the superior-subordinate relation. However, the hierarchical-relation information is not limited to the superior-subordinate relation information. For example, information on priorities (or hierarchies) ("priority (hierarchical) information") of the user's friends or various other information can be recorded as the hierarchical-relation information.

The processings explained in the present embodiment can be realized by causing a computer to execute a program prepared in advance. An example of the computer that executes the program for realizing the processings will be explained with reference to FIG. 15.

Figure 15:
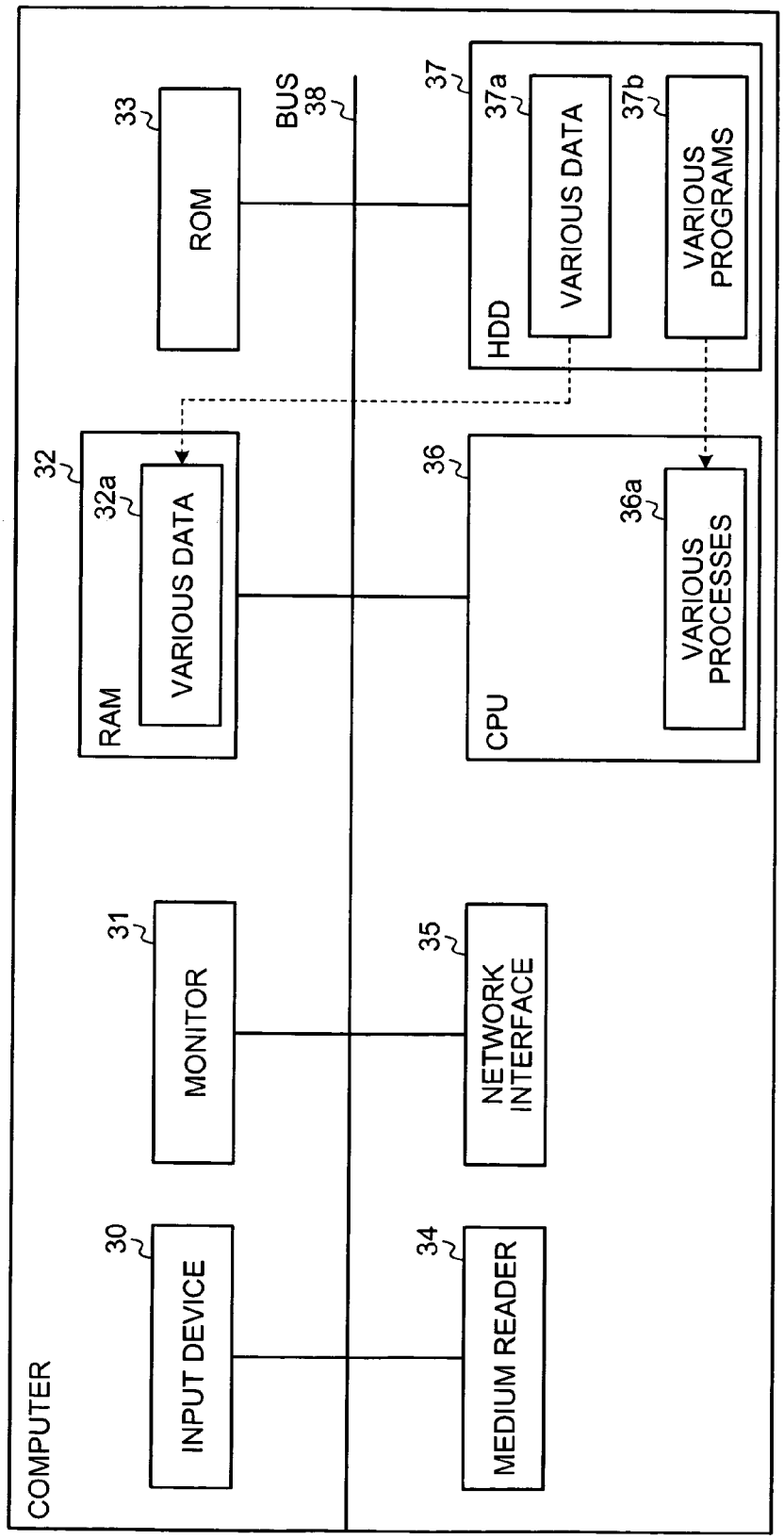
FIG. 15 is a block diagram of a computer that constitutes the information managing apparatus shown in FIG. 1.

FIG. 15 is a hardware block diagram of a computer that constitutes the information managing apparatus 100 shown in FIG. 1. The computer is configured to connect an input device 30, a monitor 31, a random access memory (RAM) 32, a read only memory (ROM) 33, a medium reader 34, a network interface 35, a central processing unit (CPU) 36, and a hard disk drive (HDD) 37 to one another by a bus 38. The input device 30 receives data from each user. The medium reader 34 reads a program from a recording medium that stores therein various programs. The network interface 35 interfaces the computer with the other computer for transmission and reception of data via a network.

The HDD 37 stores therein various programs 37b that function similarly to the functions of the information managing apparatus 100. The CPU 36 reads the various programs 37b from the HDD 37 and executes the various programs 37b, whereby various processes 36a for realizing the functions of the information managing apparatus 100 are activated.

The CPU 36 stores various data 37a corresponding to the data stored in the storing unit 150 of the information managing apparatus 100 in the HDD 37. Furthermore, the CPU 36 reads the various data 37a from the HDD 37 and stores, as various data 32a, the various data 37a in the RAM 32. The CPU 36 performs a data processing based on the various data 32a stored in the RAM 32.

The various programs 37b are not necessarily stored in the HDD 37 by default. For example, the various programs 37b can be stored in "a portable physical medium" inserted into the computer, "a fixed physical medium" provided inside or outside of the computer, "the other computer (or server)" or the like. In this case, the computer can read the various programs 37b from "the portable physical medium", "the fixed physical medium", "the other computer (or server)" or the like, and can execute the various programs 37b. Examples of "the portable physical medium" include a flexible disk (FD), a CD-ROM, a DVD disk, a magneto-optical disk, and an IC card. Examples of "the fixed physical medium" include a hard disk drive (HDD). "The other computer (or server)" is connected to the computer via a public line, the Internet, a local area network (LAN), and a wide area network (WAN).

The present embodiments of the present invention have been explained so far. However, various other embodiments can be used to carry out the present invention within the scope of the technical concept of the invention defined in claims.

Moreover, all of or a part of the processings explained as being automatically performed can be performed manually. All of or a part of the processings explained as being manually performed can be performed automatically by a well-known method.

Furthermore, the processing procedures, control procedures, specific names, and information including various data and parameters explained and shown in the specification and drawings can be changed as desired unless specified otherwise.

Moreover, the constituent elements of the information managing apparatus 100 are functionally conceptual and are not necessarily configured physically as shown in the drawings. Namely, specific forms of distribution and integration of the respective constituent elements or devices are not limited to those shown in the drawings. All of or a part of the constituent elements or devices can be distributed or integrated either functionally or physically in desired units according to various loads, utilization situations, and the like.

Furthermore, all of or a part of the processing functions performed by the respective constituent elements or devices can be realized by the CPU and the programs analyzed and executed by the CPU or realized as wired logic hardware.

As describe above, according to an embodiment of the present invention, the optimum censorship range of the article information created by the user can be set. Furthermore, leakage of secret information on the user who created the article information to the malicious third party can be prevented.

Furthermore, according to an embodiment of the present invention, the superior responsible for supervising the user who created the article information can censor the article information created by his/her subordinate. Moreover, the problems such as the invasion of privacy of the user who created the article information and the leakage of secret information related to the article information can be prevented.

Moreover, according to an embodiment of the present invention, the censorship range can be set more accurately.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable, non-transitory medium storing a program that causes a computer to execute a process, the process comprising:

authorizing, not only a first user, but also a second user to access data that is created by the first user and is stored in association with a community, wherein:

the first user is registered as a member who belongs to a group wherein a member belonging to the group is authorized to access data that is accessibly stored for the member of the group, and the second user is defined as a superior of the first user in organization information that indicates hierarchical-relation of users and does not belong to the group, and rejecting access to said data for an additional user, wherein said additional user has been determined not to be within a publication range of said data, even though said user is within a publication range of the community to which said data belongs.

2. The computer-readable, non-transitory medium according to claim 1, the procedure further comprising:

unauthorizing a third user to access the data that is created by the first user, wherein:

the third user, being another user than the second user, is defined as a superior of a fourth user in the organization information and does not belong to the group, the fourth user belonging to the group.

3. A method of a computer, the method comprising:
- the computer authorizing, not only a first user, but also a second user to access data that is created by the first user and is stored in association with a community, wherein:
- the first user is registered as a member who belongs to a group wherein a member belonging to the group is authorized to access data that is accessibly stored for the member of the group, and
- the second user is defined as a superior of the first user in organization information that indicates hierarchical-relation of users and does not belong to the group, and
- the computer rejecting access to said data for an additional user, wherein said additional user has been determined not to be within a publication range of said data, even though said user is within a publication range of the community to which said data belongs.

4. The method according to claim 3, the method further comprising:
- the computer unauthorizing a third user to access the data that is created by the first user, wherein:
- the third user, being another user than the second user, is defined as a superior of a fourth user in the organization information and does not belong to the group, the fourth user belonging to the group.

\* \* \* \* \*